Nov. 14, 1961 G. F. QUAYLE 3,008,446
WHEEL DIRECTION INDICATING MECHANISM
Filed Nov. 24, 1959 2 Sheets-Sheet 1
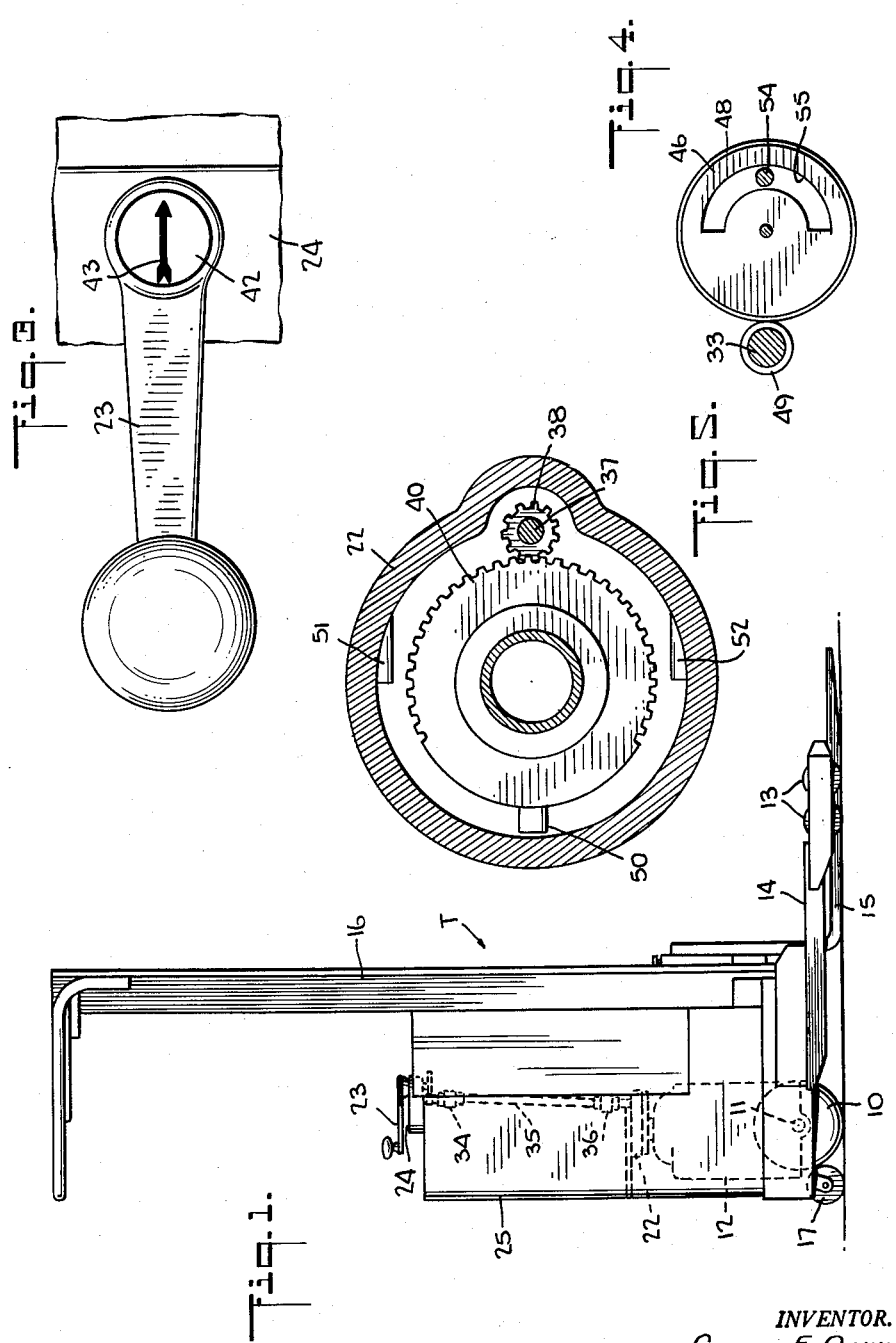
INVENTOR.
GEORGE F. QUAYLE
BY
*A. H. Golden*
ATTORNEY Nov. 14, 1961  G. F. QUAYLE  3,008,446
WHEEL DIRECTION INDICATING MECHANISM
Filed Nov. 24, 1959  2 Sheets-Sheet 2
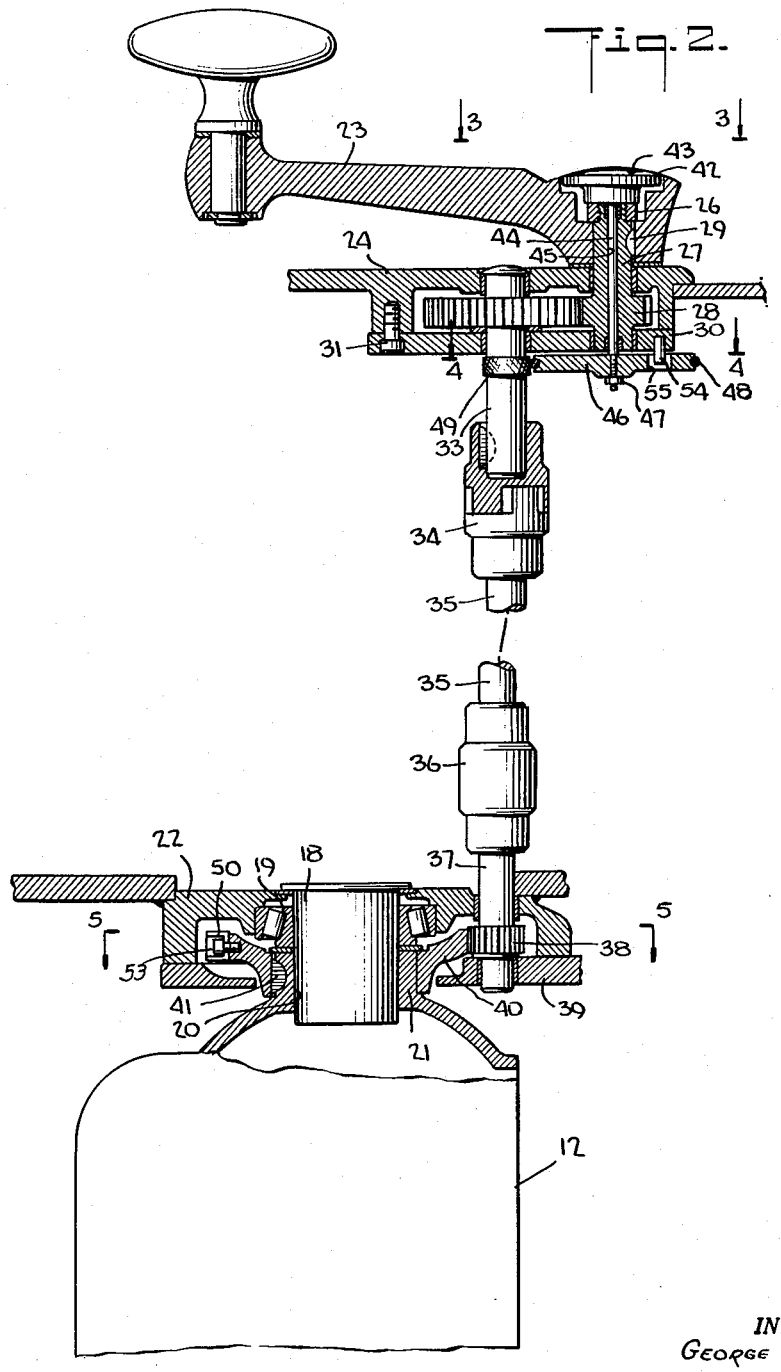
INVENTOR.
GEORGE F. QUAYLE
BY
*A. H. Golden*
ATTORNEY

United States Patent Office 3,008,446
Patented Nov. 14, 1961

3,008,446
WHEEL DIRECTION INDICATING
MECHANISM
George F. Quayle, Philadelphia, Pa., assignor to The Yale and Towne Manufacturing Company, Stamford, Conn., a corporation of Connecticut
Filed Nov. 24, 1959, Ser. No. 855,164
7 Claims. (Cl. 116—31)

This invention relates to a mechanism for providing visual indication of the angular position of the steerable wheel or wheels of a vehicle.

Vehicles, and in particular material handling trucks, which must be maneuvered in close quarters are sometimes provided with a mechanism providing visual indication to the operator of the angular position of the steerable wheel or wheels of the vehicle so that the operator knows, without leaving the vehicle, the direction in which the vehicle will move when the vehicle is started.

Most vehicles incorporate steering systems in which the steering wheel is so connected to the steerable wheel that the latter is turned at a different angular velocity from that at which the steering wheel is turned. Accordingly, a mark or pointer on the steering wheel of a vehicle incorporating such a steering system cannot be used to indicate the angular position of the steerable wheel because the steering wheel and steerable wheel do not turn simultaneously through the same angle. It has, therefore, been proposed that a separate rotatable indicator or pointer be provided which is visible to the operator and which is connected by a gear drive to the rotatable support for the steerable wheel so as to turn at the same angular velocity as the steerable wheel to indicate the angular position of the steerable wheel at all times. While such a mechanism functions quite satisfactorily the gears utilized in such a mechanism are necessarily expensive.

The present invention provides a mechanism for indicating the angular position of the steerable wheel which utilizes a very inexpensive friction drive, instead of an expensive gear drive, to rotate the indicator at the same angular velocity as the rotatable wheel support. The use of such a non-positive friction drive is feasible in the present invention because the mechanism also provides for quickly and easily correcting any misalignment between the indicator and the steerable wheel, due to slippage in the friction drive, by merely turning the steerable wheel to its extreme position of turn.

To provide this correcting function, the mechanism of the present invention includes stop means for limiting steering rotation of the rotatable support to a predetermined angle, and further stop means for limiting rotation of the indicator to the same angle. Thus, if any slippage occurs in the friction drive so that the indicator is out of alignment with the steerable wheel, turning of the support for the steerable wheel alternately to both of its extreme angular positions as determined by its stop means will also move the indicator in one direction to the same extreme angular position as determined by its stop means, so that the indicator and the steerable wheel are again aligned. Such correction will occur during normal operation of the vehicle as the steerable wheel will be often turned to its extreme angular positions during such operation of the vehicle.

The present invention also provides an advantage in the assembling of the vehicle, as the indicator does not have to be properly aligned with the steerable wheel during assembly, as is the case with gear driven indicators. The indicator of the present invention may be easily aligned with the steerable wheel after assembly of the truck by merely turning the steerable wheel to its extreme angular positions.

The present invention having been broadly described, a more detailed description of one embodiment of the invention is given hereafter by reference to the accompanying drawings wherein:

FIG. 1 is a side elevational view of a lift truck incorporating the mechanism of the invention for providing visual indication of the angular position of the steerable wheel of the truck;

FIG. 2 is an enlarged sectional view showing the steering mechanism of the truck shown in FIG. 1 and the mechanism of the present invention;

FIG. 3 is a plan view taken in the direction of the arrows of lines 3—3 of FIG. 2 to show the top of the indicator;

FIG. 4 is a sectional view taken on the line 4—4 of FIG. 2 to show the stop means for limiting rotation of the indicator, and FIG. 5 is a sectional view taken on line 5—5 of FIG. 2 to show the stop means for limiting rotation of the rotatable support for the steerable wheel.

Referring to the drawings, and in particular to FIG. 1, the present invention is shown applied to a conventional straddle type lift truck, generally designated by the reference letter T. While the invention is described hereafter in conjunction with such a truck, it will be appreciated that the invention is also applicable to other types and styles of vehicles.

The truck is driven and steered by a ground wheel 10 which is carried on an axle 11 secured to a rotatably mounted combined motor and wheel support 12. The forward end of the truck T is supported on wheels 13 carried by a pair of straddle arms 14. While only one of the straddle arms 14 can be seen in the drawing, it will be appreciated that the other straddle arm is positioned on the other side of the truck so that lift forks 15 may be moved down against the ground between the straddle arms. The forks 15 are adapted to be elevated on a mast structure 16 in the conventional manner. A caster wheel 17 mounted at the rear of the truck and spaced laterally from the steerable ground wheel 10 provides the truck with additional stability.

Referring to FIG. 2, the wheel support 12 is mounted for steering rotation relatively to the truck by a king pin 18 which extends through the inner race of a thrust bearing 19 and through an opening 20 in an annular projection 21 provided at the top of the wheel support 12. The thrust bearing 19 is carried by a frame member 22 and accepts the thrust between the wheel support 12 and the truck frame while permitting rotation of the wheel support 12.

The wheel support 12 is adapted to be rotated to effect steering movement of the wheel 10 by operation of a steering wheel or handle 23 positioned at the top 24 of a housing 25. The steering wheel 23 is secured by means of a nut 26 to the upper end of a shaft 27. Shaft 27 is integral with a pinion 28, and steering wheel 23 is keyed to the shaft 27 by a key 29 so that rotation of the steering wheel 23 serves to rotate pinion 28. The shaft 27 is suitably journalled in the top 24 and in a frame member 30 secured to the top member 24 by bolt 31.

Pinion 28 meshes with a gear 32 so that rotation of pinion 28 serves to rotate gear 32. Gear 32 is secured to a shaft 33 which is suitably journalled in the top 24 and the frame member 30. The lower end of the shaft 33 is connected by a universal joint 34 to the upper end of an elongated shaft 35 which extends through the housing 25, as best shown in FIG. 1. The lower end of the shaft 35 is connected by means of a universal joint 36 to the upper end of a shaft 37 which is formed integrally with a pinion 38. The shaft 37 is suitably journalled in frame member 22 and in a frame member 39. Rotation of gear 32 therefore serves to rotate shaft 35 and pinion 38.

Pinion 38 meshes with a gear 40 which is carried on the annular projection 21 of the wheel support 12 and is keyed thereto by key 41. Rotation of pinion 38 therefore serves to rotate gear 40 and the wheel support 12 secured thereto. It will be appreciated that by reason of this gear arrangement rotation of steering wheel 23 results in rotation of the wheel support 12 at a different angular velocity than that in which the steering wheel 23 is rotated and that the position of the steering wheel 23 does not therefore directly indicate the angular position of the wheel 10.

The mechanism of the present invention for providing visual indication of the angular position of the steerable wheel 10 includes an indicator in the form of a disk 42 having an arrow 43, best shown in FIG. 3, stamped or engraved therein. The disk 42 is secured to the upper end of a shaft 44. The shaft 44 extends through and is freely rotatable in a bore 45 through the shaft 27 so that the disk 42 and shaft 44 may rotate relatively to the shaft 27 and the steering wheel 23.

A friction wheel 46 is threaded on the lower end of the shaft 44 and secured thereto by a nut 47 so that shaft 44 is rotated by rotation of the friction wheel 46. The outer peripheral surface of the friction wheel 46 is formed by a rubber O-ring 48 carried in a peripheral groove in the friction wheel 46. The O-ring 48 frictionally engages a knurled collar 49 secured to or formed as an integral part of the shaft 33, thereby forming a friction drive between shaft 33 and shaft 44. Rotation of the shaft 33 during steering of the truck, therefore, results in rotation of shaft 44 and the indicator disk 42 secured thereto. The effective diameter of the friction wheel 46 relatively to the diameter of the collar 49 and to the pitch diameters of the pinion 38 and gear 40 is such that the disk 42 is rotated at the same angular velocity as the wheel support 12, and assuming no slippage, the arrow 43 on the disk 42 will indicate the direction of the steered wheel 10.

Referring to FIG. 5, steering rotation of the wheel support 12 is limited to a predetermined angle by engagement of a stop member 50 secured to gear 40 with either a stop lug 51 or a stop lug 52 extending from and secured to the frame member 22. As best shown in FIG. 2, the stop member 50 is secured to the gear 40 by a screw 53.

Referring to FIGS. 2 and 3, rotation of the indicator disk 42 is limited to the same angle of rotation as that of the wheel support 12 by means of a stop pin 54 which is secured to frame member 30 and extends into an arcuate slot 55 formed in the friction wheel 46. The slot 55 has the same angular extent as that between the stop lugs 51 and 52. Assuming, therefore, that the arrow 43 on the indicator disk 42 is in alignment with the wheel 10, i.e. points in the same direction as the wheel 10, one end or the other of the slot 55 will engage the pin 54 at the same time that the stop member 50 engages either stop lug 51 or 52, when the wheel support 12 is rotated to its extreme angular positions. If, for any reason, the arrow 43 on the indicator disk 42 is not in alignment with the wheel 10, one end of the slot 55 will engage the stop pin 54 before the stop member 50 engages one of the lugs 51 or 52 when the wheel support 12 is turned in one direction or other. However, continued rotation of the wheel support 12 in the same direction, resulting in slippage between the friction wheel 46 and the collar 49, will bring the stop member 50 against one of the lugs 51 or 52, so that the indicator disk 42 and the wheel support 12 are both in an extreme angular position, and the arrow 43 and the wheel 10 are again in alignment. Thus, any misalignment between the indicator and the wheel 10 may be quickly and easily corrected by alternately turning the wheel support to both its extreme angular positions.

From the preceding description it can be seen that there is provided a relatively inexpensive mechanism for indicating the angular position of the steerable wheel or wheels of a vehicle. Any slippage in the friction drive of the mechanism may be quickly and easily corrected by turning the steerable wheel to its extreme positions of steer. By reason of a provision of the friction drive, no special care need be taken during assembling of the vehicle to align the indicator and the steerable wheel, as they may be quickly and easily aligned after the vehicle has been assembled.

While one embodiment of the invention has been shown and described, it will be appreciated that this is for the purpose of illustration and that changes and modifications can be made therein without departing from the spirit and scope of the invention.

I now claim:

1. In a vehicle, a wheel support, a ground wheel secured to said support, means mounting said support for steering rotation, means for rotating said support to steer said ground wheel, means limiting rotation of said support to a predetermined angle, an indicator, means supporting said indicator for rotation, a friction drive connecting said indicator to said support to turn said indicator at the same angular velocity as said support, and means limiting rotation of said indicator to the same angle of rotation as said support.

2. In a vehicle, a wheel support, a ground wheel secured to said support, means mounting said support for steering rotation, a steering wheel, a positive drive connecting said steering wheel and said support whereby rotation of said steering wheel will rotate said support at a different angular velocity than said steering wheel to steer said ground wheel, means limiting rotation of said support to a predetermined angle, an indicator, means supporting said indicator for rotation, a friction drive connecting said indicator to said support to turn said indicator at the same angular velocity as said support, and means limiting rotation of said indicator to the same angle of rotation as said support.

3. In a vehicle, a wheel support, a ground wheel secured to said support, means mounting said support for steering rotation, a steering wheel, a positive drive connecting said steering wheel and said support whereby rotation of said steering wheel rotates said support at a different angular velocity than said steering wheel to steer said ground wheel, means limiting rotation of said support to a predetermined angle, an indicator, means supporting said indicator for rotation a friction drive connecting said positive drive and said indicator to turn said indicator at the same angular velocity as said support, and means limiting rotation of said indicator to the same angle of rotation as said support.

4. In a vehicle, a wheel support, a ground wheel secured to said support, means mounting said support for steering rotation, a steering wheel, a positive drive including a shaft connecting said steering wheel and said support whereby rotation of said steering wheel rotates said support at a different angular velocity than said steering wheel to steer said ground wheel, means limiting rotation of said support to a predetermined angle, an indicator, means supporting said indicator for rotation, a friction drive connecting said shaft and said indicator to turn said indicator at the same angular velocity as said support, and means limiting rotation of said indicator to the same angle of rotation as said support.

5. In a vehicle, a wheel support, a ground wheel secured to said support, means mounting said support for steering rotation, a steering wheel, a positive drive including a shaft connecting said steering wheel and said support whereby rotation of said steering wheel rotates said support at a different angular velocity than said steering wheel to steer said ground wheel, means limiting rotation of said support to a predetermined angle, an indicator, means supporting said indicator for rotation, a friction wheel frictionally engaging said shaft and connected to said indicator to turn said indicator at the same angular velocity as said support, and means limiting rotation of said indicator to the same angle of rotation as said support.

6. In a vehicle, a wheel support, a ground wheel secured to said support, means mounting said support for steering rotation, a shaft in driving connection with said support, means for rotating said shaft to rotate said support, means limiting rotation of said support to a predetermined angle, an indicator, means supporting said indicator for rotation, a friction wheel frictionally engaging said shaft and connected to said indicator to turn said indicator at the same angular velocity as said support, and means limiting rotation of said indicator to the same angle of rotation as said support.

7. In a vehicle of the class described, a steering ground wheel, a steering mechanism whereby said steering ground wheel is actuated, an indicator, an overriding driving mechanism connecting said indicator to said steering mechanism for turning said indicator as said steering mechanism steers said steering ground wheel, means limiting steering movement of said steering ground wheel to a predetermined angle, and means limiting rotation of said indicator to the same predetermined angle as said steering ground wheel whereby to hold said indicator against rotation by said overriding means while said steering ground wheel continues its rotation so as to realign said indicator with said steering ground wheel.

References Cited in the file of this patent

UNITED STATES PATENTS

| | | |
|---|---|---|
| 1,812,674 | Bach | June 30, 1931 |
| 2,105,158 | Pearce et al. | Jan. 11, 1938 |
| 2,151,534 | Scofield | Mar. 21, 1939 |
| 2,387,159 | Lee | Oct. 16, 1945 |
| 2,786,436 | Arnot | Mar. 26, 1957 |